US008682270B2

(12) United States Patent
Aoki et al.

(10) Patent No.: US 8,682,270 B2
(45) Date of Patent: Mar. 25, 2014

(54) RECEIVER HAVING MULTIPATH EQUALIZER

(75) Inventors: Tsuguhide Aoki, Kawasaki (JP); Kiyonori Takahashi, Sagamihara (JP); Yutaka Matsumoto, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 896 days.

(21) Appl. No.: 12/202,767

(22) Filed: Sep. 2, 2008

(65) Prior Publication Data

US 2009/0061802 A1 Mar. 5, 2009

(30) Foreign Application Priority Data

Sep. 3, 2007 (JP) ................................. 2007-228205

(51) Int. Cl.
H04B 17/02 (2006.01)

(52) U.S. Cl.
USPC ..... 455/138; 455/226.2; 455/273; 455/245.1; 455/247.1

(58) Field of Classification Search
USPC ........ 455/132–141, 272–279.1, 226.2, 245.1, 455/247.1
See application file for complete search history.

(56) References Cited

U.S. PATENT DOCUMENTS

| 4,415,872 | A | * | 11/1983 | Karabinis | 333/18 |
|---|---|---|---|---|---|
| 6,018,643 | A | * | 1/2000 | Golemon et al. | 455/63.4 |
| 6,643,339 | B1 | * | 11/2003 | Okanoue et al. | 375/349 |
| 6,760,386 | B2 | * | 7/2004 | Li et al. | 375/267 |
| 7,221,925 | B2 | * | 5/2007 | Wildhagen | 455/312 |
| 8,270,924 | B2 | * | 9/2012 | Lindenmeier et al. | 455/277.1 |
| 2002/0072343 | A1 | * | 6/2002 | Miyatani | 455/272 |
| 2003/0058962 | A1 | * | 3/2003 | Baldwin | 375/316 |
| 2004/0203812 | A1 | * | 10/2004 | Malladi et al. | 455/450 |
| 2009/0221253 | A1 | * | 9/2009 | Yamamoto et al. | 455/273 |
| 2010/0157909 | A1 | * | 6/2010 | Miura et al. | 370/329 |

FOREIGN PATENT DOCUMENTS

| JP | 7-245526 A | 9/1995 |
|---|---|---|
| JP | 2006-238295 | 9/2006 |

OTHER PUBLICATIONS

Webster's II new Riverside university Dictionary, 1984.*
Japanese Office Action issued on Apr. 19, 2011 in corresponding Japanese Application No. 2007-228205 (with an English Translation).

* cited by examiner

Primary Examiner — Edward Urban
Assistant Examiner — Rui Hu
(74) Attorney, Agent, or Firm — Oblon, Spivak, McClelland, Maier & Neustadt, L.L.P.

(57) ABSTRACT

An FM receiver includes a receiving unit that receives a signal from a broadcasting station and outputs a receiving signal, an equalizer that equalizes the receiving signal by using a calculated weight, and obtains an equalized output signal, a demodulator that demodulates the equalized output signal to reproduce the signal from the broadcasting station, a detection unit that observes size of the calculated weight to detect a capture state with respect to an undesired broadcasting station and generates a capture detection signal, and a weight setting unit that sets the calculated weight with respect to the equalizer at a steady state, and sets a specific weight for temporarily setting the equalizer in a through state when the capture detection signal is generated.

21 Claims, 12 Drawing Sheets

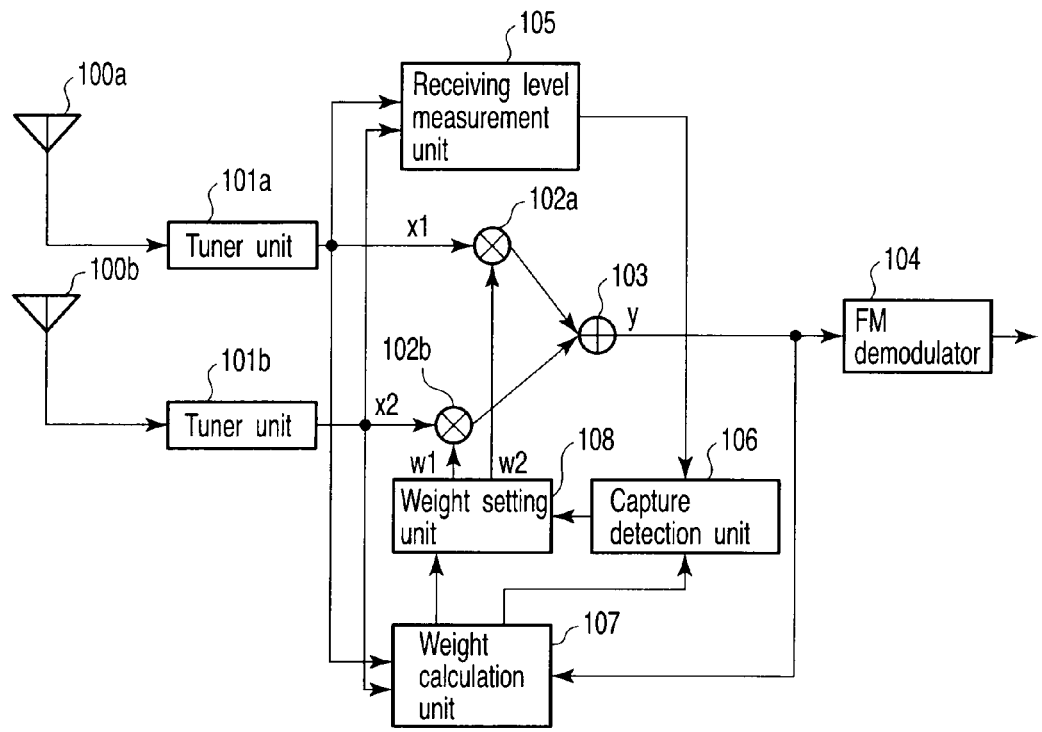
F I G. 1
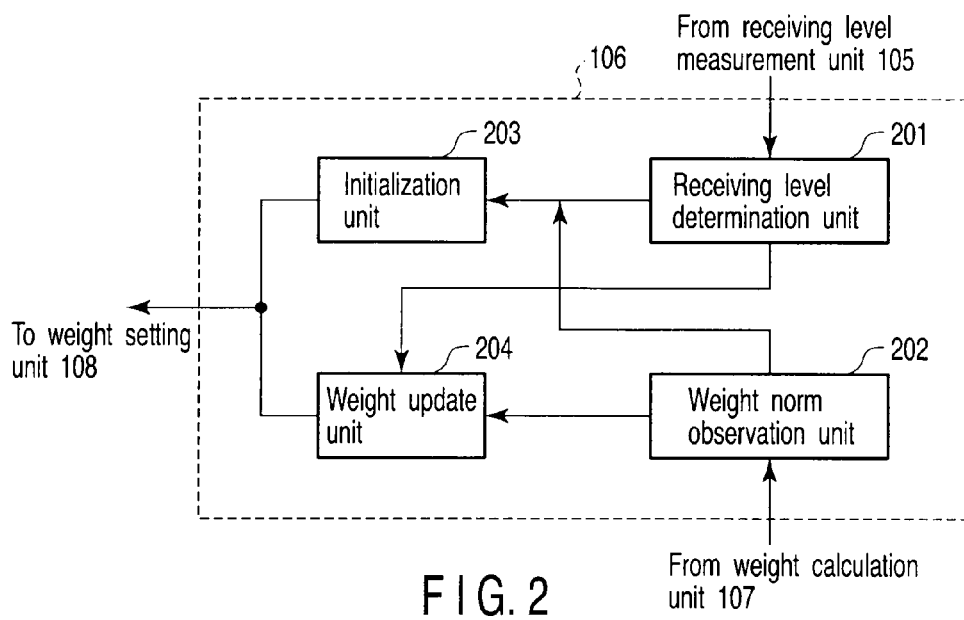
F I G. 2

FIG. 4A Receiving signal from A station

FIG. 4B Receiving signal from B station

FIG. 4C Composite receiving signal

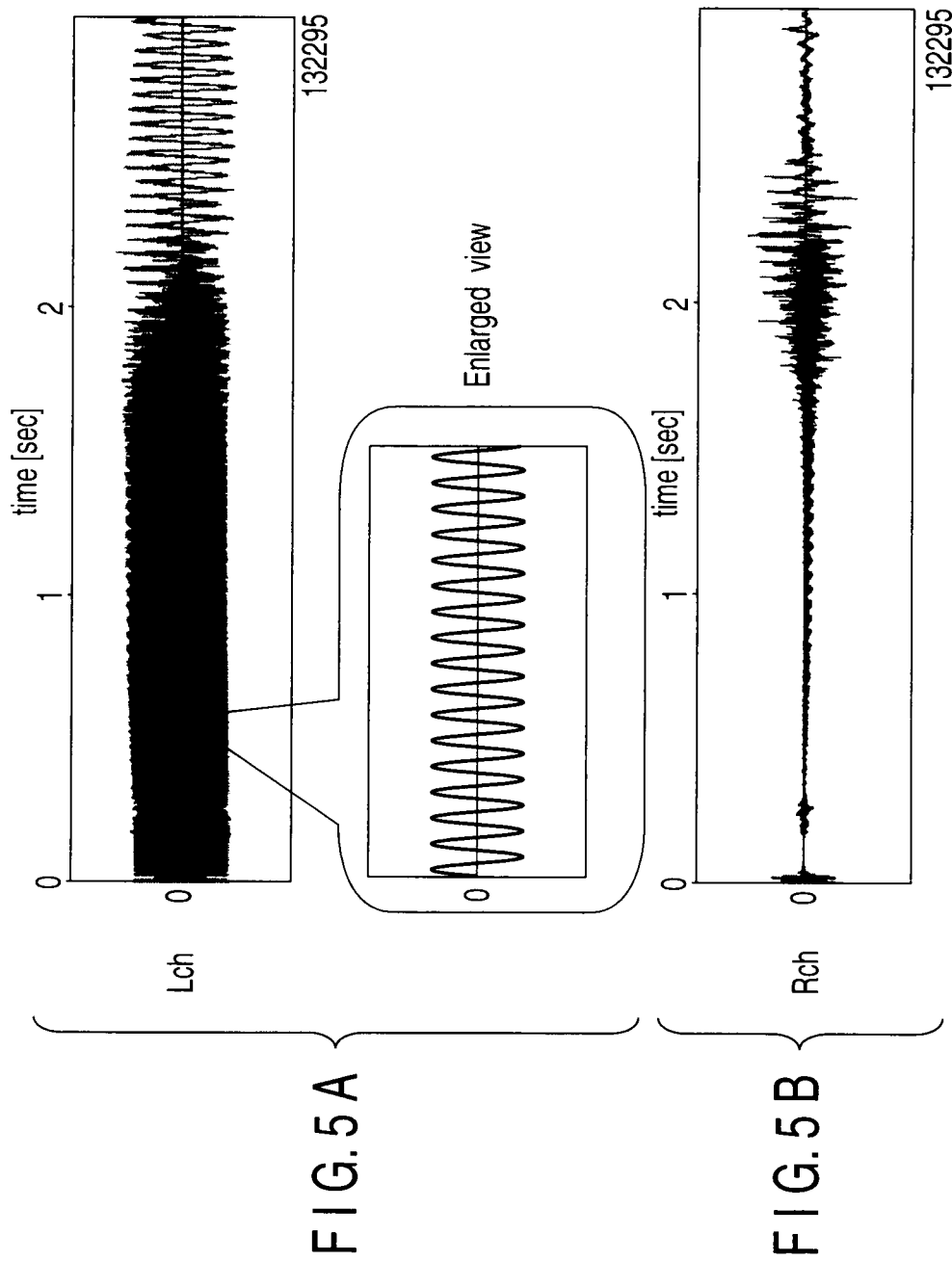
F I G. 5 A
F I G. 5 B

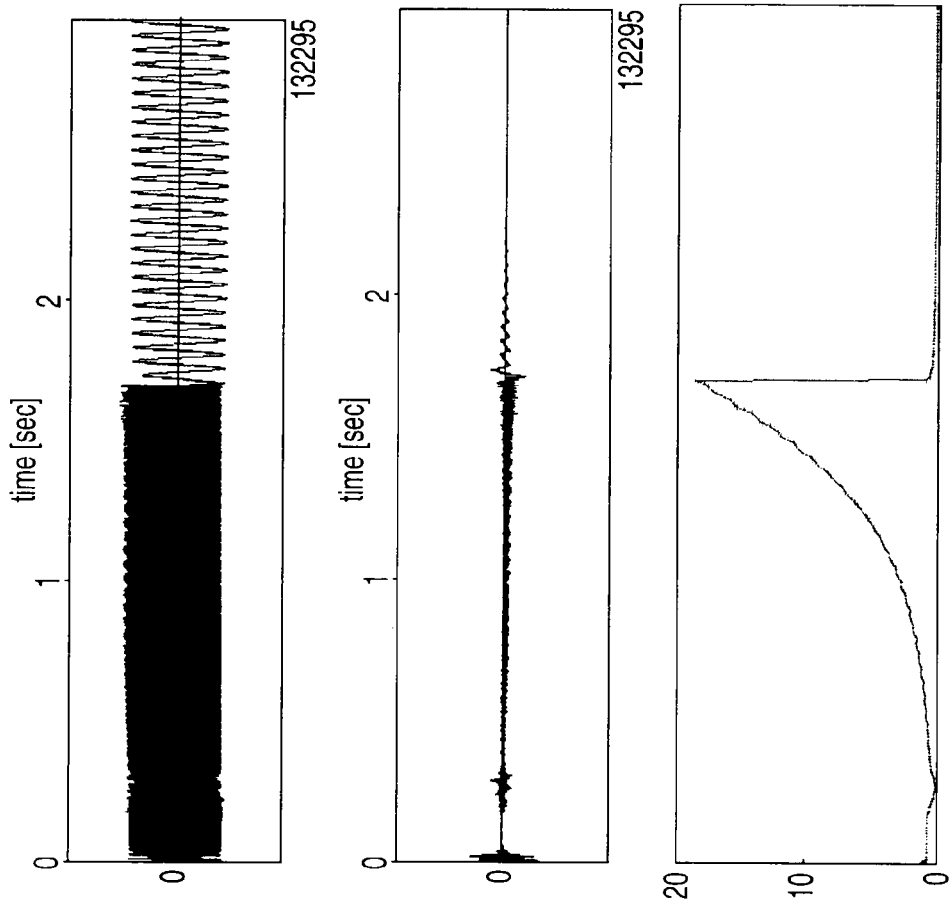
F I G. 6 A
F I G. 6 B
F I G. 6 C

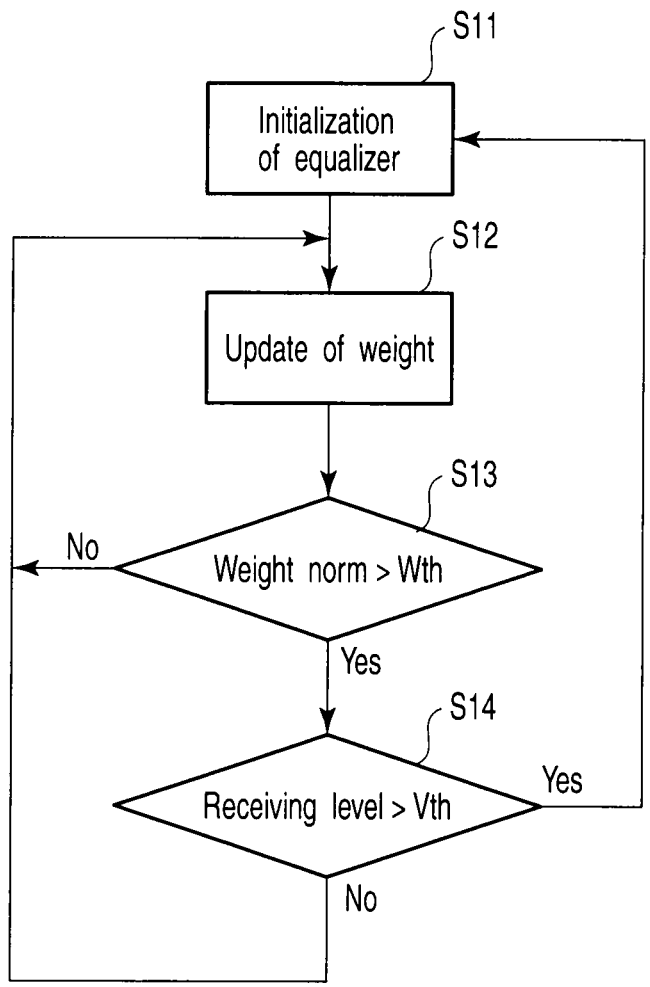
F I G. 7

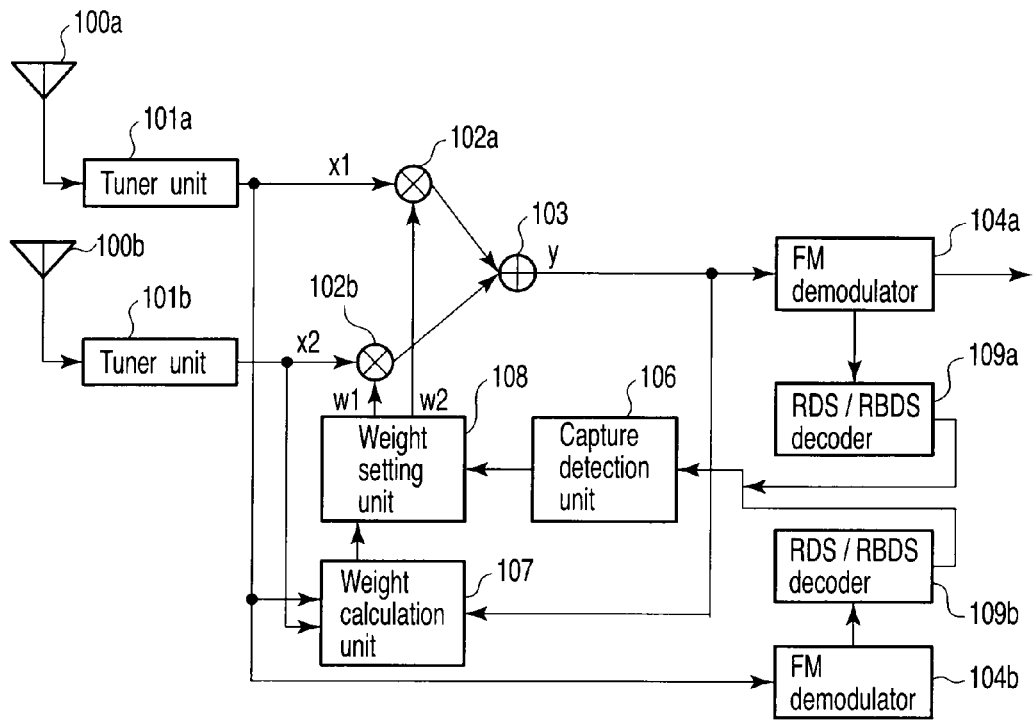
F I G. 8
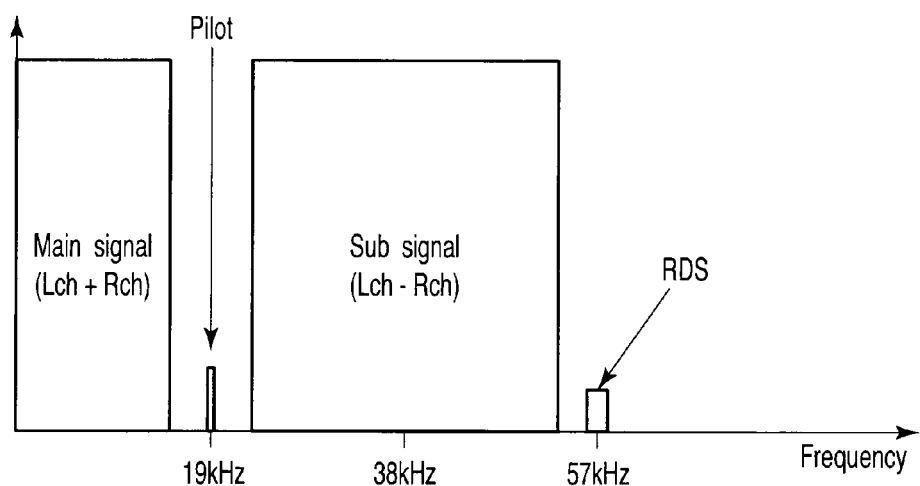
F I G. 9

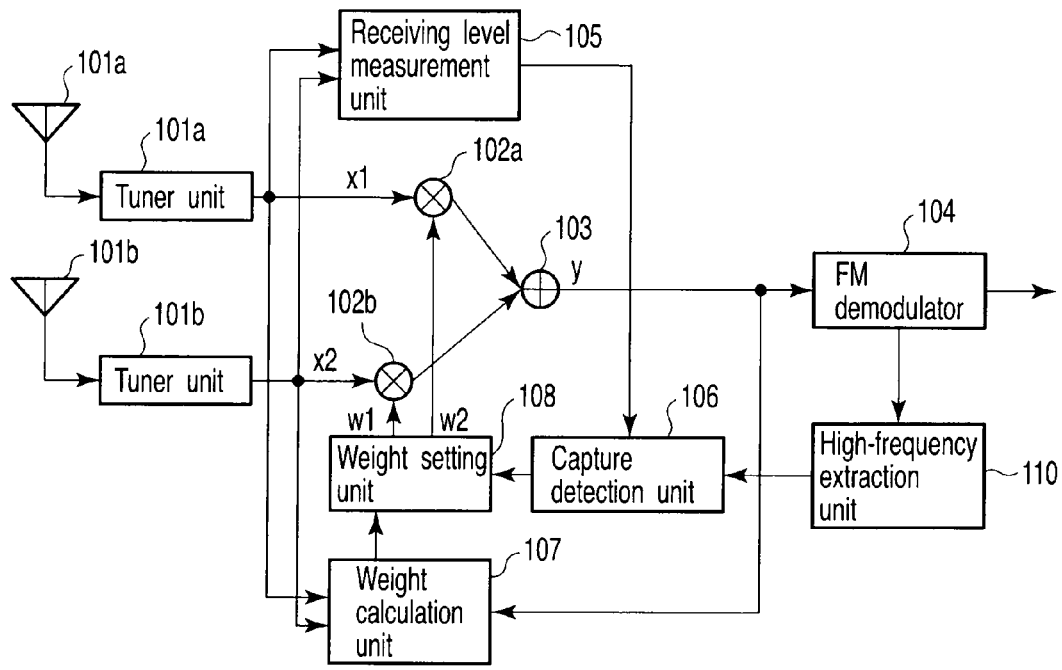
F I G. 1 1
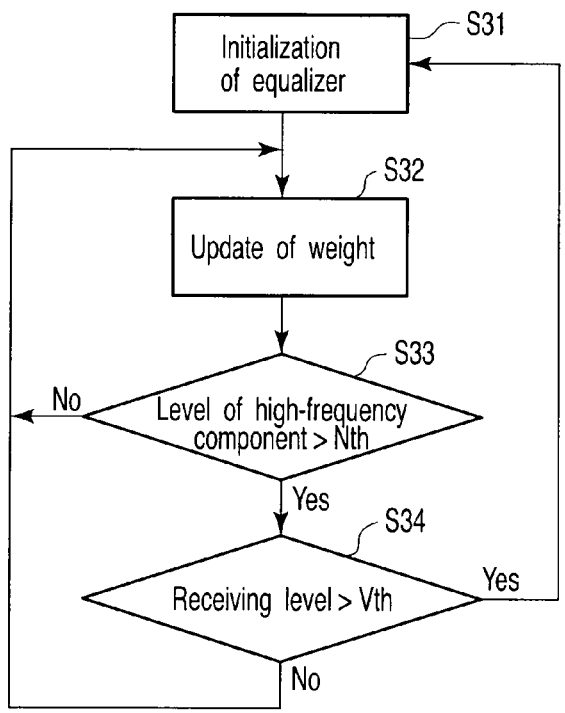
F I G. 1 2

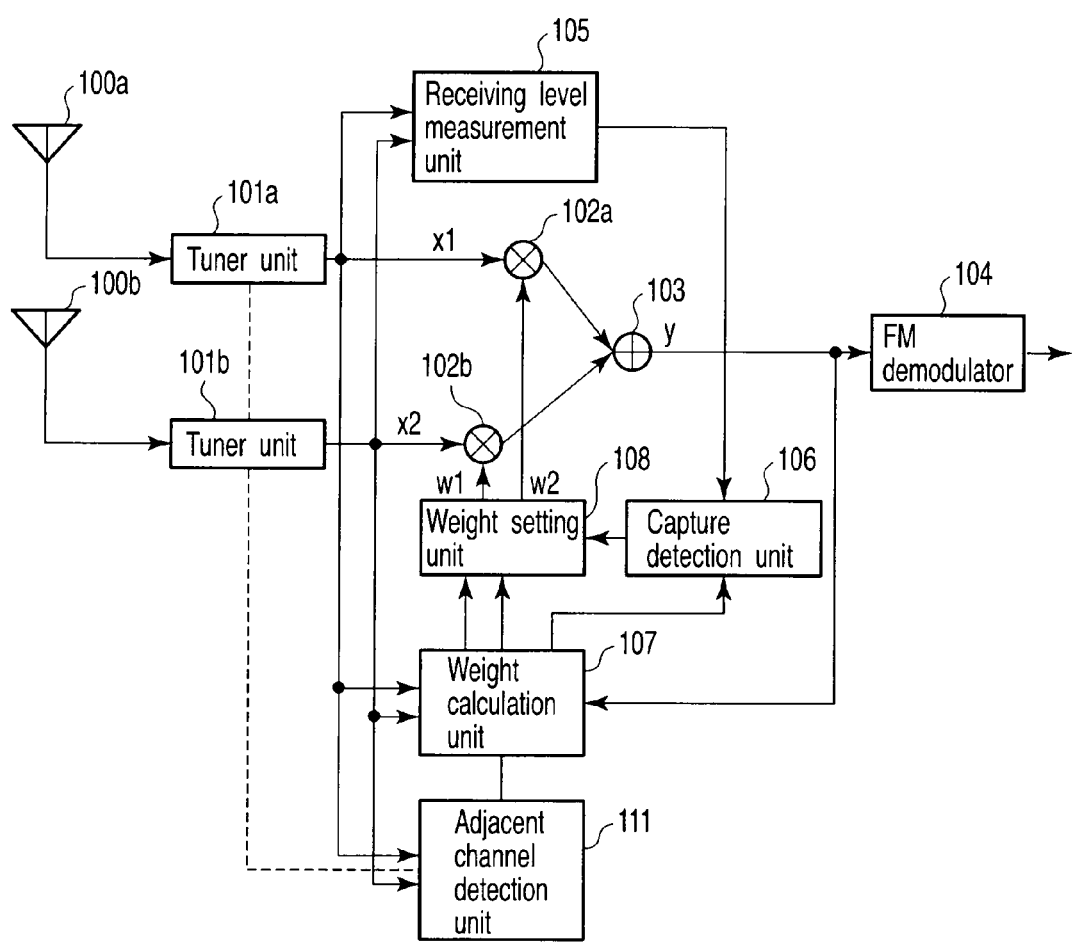
F I G. 1 3

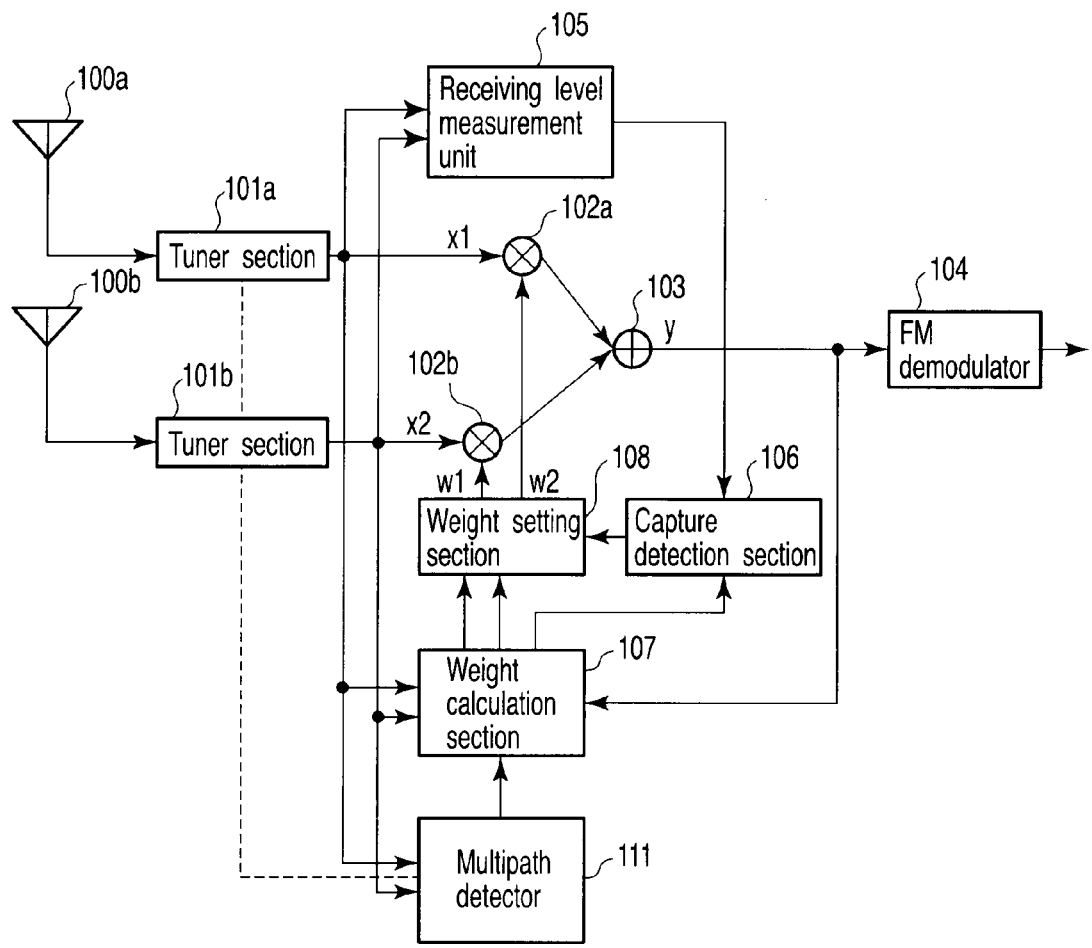
F I G. 16

RECEIVER HAVING MULTIPATH EQUALIZER

CROSS-REFERENCE TO RELATED APPLICATIONS

This application is based upon and claims the benefit of priority from prior Japanese Patent Application No. 2007-228205, filed Sep. 3, 2007, the entire contents of which are incorporated herein by reference.

BACKGROUND OF THE INVENTION

1. Field of the Invention

The present invention relates to a receiver that has a multipath equalizer.

2. Description of the Related Art

As one of forms of FM broadcasting, there is broadcasting that broadcasts the same program at the same frequencies in order to efficiently use frequency resources. Now, A station and B station are assumed to carry out FM broadcasting at the same frequency, and an FM receiver is assumed to be located in the vicinity of A station and receive a signal from A station at a strong level. In this case, the FM receiver operates in a manner receiving and reproducing a signal from A station based on a principle of FM modulation. When the FM receiver is located in the vicinity of B station, the FM receiver operates in a manner receiving and reproducing a signal from B station. As described above, there is a nature (called a nature phenomenon) of receiving, reproducing, and outputting a signal with a stronger receiving level in FM demodulation.

Since FM modulation is a modulation system that superimposes information on frequencies of a signal, there is a certain degree of resistance to fading. However, under a multipath fading environment having a long delay time, performance deterioration called multipath distortion occurs. As a technique to reduce the multipath distortion, there is multipath equalizer. The multipath equalizer is a technique that controls a weight for equalizer corresponding to a propagation path in an adaptive manner to reduce multipath distortion.

The multipath equalizer enables provision of an FM receiver with reduced multipath distortion and excellent sound quality. On the other hand, there is a side effect that the capture phenomenon described above is intensified. For example, consideration will be made with respect to a case where there are two stations, A station and B station, that exist adjacent to each other, and an FM receiver equipped in a moving station such as a car moves from a location a in the vicinity of A station to a location b in the vicinity of B station. In this case, at the location a, a receiving level of a signal from A station is high and a receiving level of a signal from B station is low. When the FM receiver is moved near the location b, this relationship is reversed in due time.

The FM receiver not equipped with an equalizer that carries out multipath equalization as described above receives and reproduces a signal from A station while a receiving level of a signal from A station in the vicinity of the location a is high, and receives and reproduces a signal from B station when a receiving level of a signal from B station becomes high after moving to the location b. That is, the FM receiver receives and reproduces a signal from a broadcasting station with a high receiving level at all times.

In contrast, in an FM receiver equipped with an equalizer, a phenomenon, in which a signal from A station is received and reproduced even when a receiving level of a signal from B station becomes high by moving to the location b, occurs. This phenomenon is generated due to a reason that once the FM receiver acquires a signal from A station when the FM receiver is located in the vicinity of A station, an effect of such acquisition continues even when a receiving level of a signal from B station becomes high.

JP-A 2006-238295 (KOKAI) discloses a technique that initializes and restarts adapting processing with respect to a receiving signal when receiving of a signal other than a signal from a desired station is determined to be detected based on a program identity (PI) which is obtained as a result of decoding carried out by a radio data system (RDS) decoder. By this technique, possibility of capturing a signal from a desired station can be increased.

In the system described in the above document, even when there are a plurality of broadcasting stations that broadcasts the same program at the same frequencies, only a signal from a desired station that is determined in advance is received. Accordingly, a signal from a broadcasting station with high receiving level cannot be always received and reproduced.

BRIEF SUMMARY OF THE INVENTION

According to an aspect of the present invention, there is provided a receiver that includes: a receiving unit that receives a signal from a broadcasting station and outputs a receiving signal; an equalizer that equalizes the receiving signal by using a calculated weight and obtains an equalized output signal; a demodulator that demodulates the equalized output signal to reproduce the signal from the broadcasting station; a detection unit that observes size of the calculated weight to detect a capture state with respect to an undesired broadcasting station and generates a capture detection signal; and a weight setting unit that sets the calculated weight with respect to the equalizer at a stationary state and sets a specific weight for temporarily setting the equalizer in a through state when the capture detection signal is generated.

According to another aspect of the present invention, there is provided a receiver that includes: a receiving unit that receives a signal from a broadcasting station and outputs a receiving signal; an equalizer that equalizes the receiving signal by using a calculated weight and obtains an equalized output signal; a demodulator that demodulates the equalized output signal to reproduce the signal from the broadcasting station; a measurement unit that measures a level of the receiving signal; and a weight setting unit that sets the calculated weight with respect to the equalizer at a stationary state and sets a specific weight for temporarily setting the equalizer in a through state when size of the calculated weight exceeds a first threshold value and a receiving level of the receiving signal exceeds a second threshold value.

According to still another aspect of the present invention, there is provided a receiver that includes: a receiving unit that receives a signal from a broadcasting station and outputs a receiving signal; an equalizer that equalizes the receiving signal by using a calculated weight and obtains an equalized output signal; a demodulator that demodulates the equalized output signal to reproduce the signal from the broadcasting station; a first extraction unit that extracts first station identification information included in a signal from the broadcasting station from the equalized output signal; a second extraction unit that extracts second station identification information included in the receiving signal; a detection unit that compares the first station identification information and the second station identification information to detect a capture state with respect to an undesired broadcasting station and generates a capture detection signal; and a weight setting unit that sets the calculated weight with respect to the equalizer at a stationary state and sets a specific weight for temporarily setting the equalizer in a through state when the capture detection signal is generated.

According to yet still another aspect of the present invention, there is provided a receiver that includes: a receiving unit that receives a signal from a broadcasting station and outputs a receiving signal; an equalizer that equalizes the receiving signal by using a calculated weight and obtains an equalized output signal; a demodulator that demodulates the equalized output signal to reproduce the signal from the broadcasting station; an extraction unit that extracts a high-frequency component from the reproduced signal; a detection unit that observes a level of the high-frequency component to detect a capture state with respect to an undesired broadcasting station and generates a capture detection signal; and a weight setting unit that sets the calculated weight with respect to the equalizer at a stationary state and sets a specific weight for temporarily setting the equalizer in a through state when the capture detection signal is generated.

BRIEF DESCRIPTION OF THE SEVERAL VIEWS OF THE DRAWING

FIG. 1 is a block diagram showing an FM receiver according to a first embodiment;

FIG. 2 is a block diagram showing a specific example of a capture detection unit;

FIGS. 5A and 5B are views that explain equalizing processing by a normal multipath equalizer;

FIGS. 6A to 6C are views that explain equalizing processing by the multipath equalizer in the first embodiment;

FIG. 7 is a flowchart showing a flow of the equalizing processing by the multipath equalizer in the first embodiment;

FIG. 8 is a block diagram showing the FM receiver according to a second embodiment;

FIG. 9 is a view showing a frequency allocation of an FM composite signal;

FIG. 11 is a block diagram showing the FM receiver according to a third embodiment;

FIG. 12 is a flowchart showing a flow of the equalizing processing by the multipath equalizer in the third embodiment;

FIG. 13 is a block diagram showing the FM receiver according to a fourth embodiment;

FIG. 16 is a block diagram showing an FM receiver according to a fifth embodiment.

Figure 3:
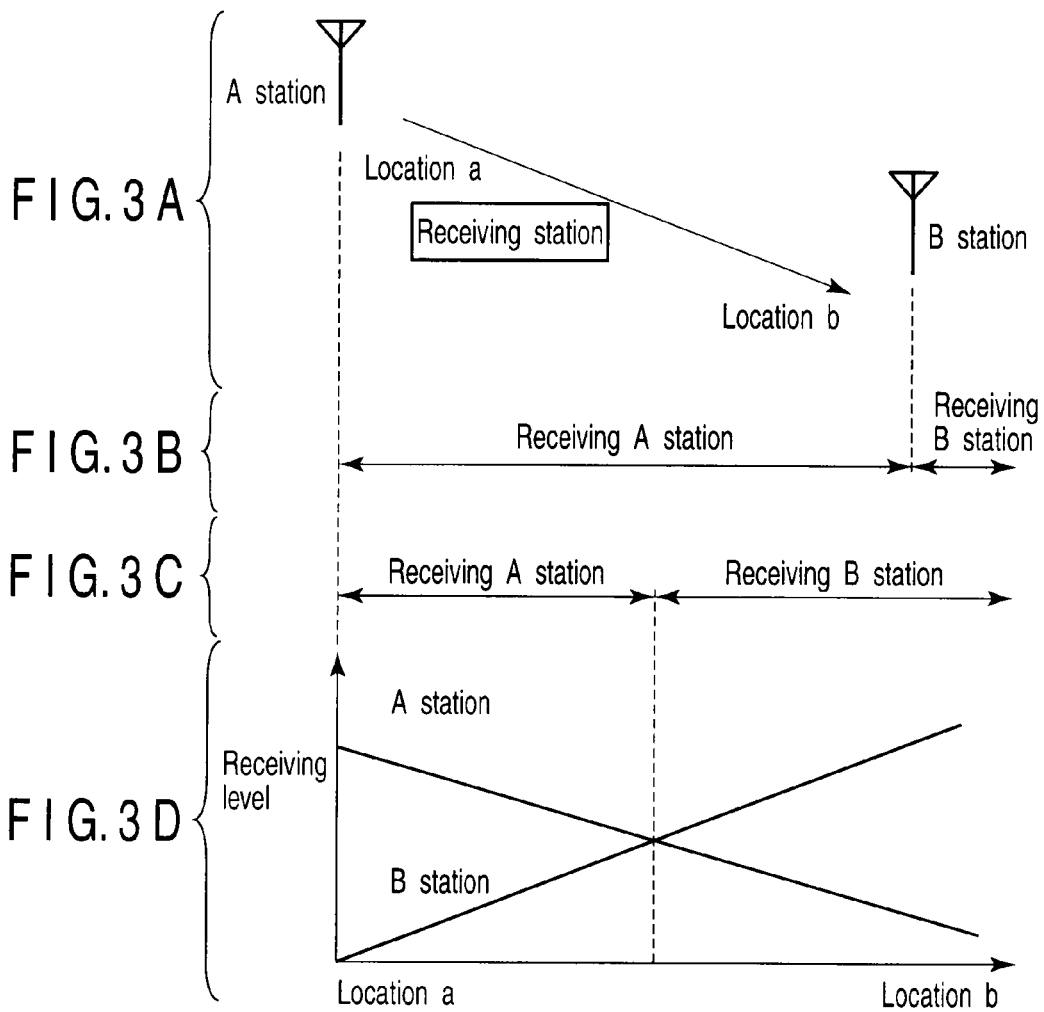
FIGS. 3A to 3D are views that describe a difference in a receiving situation between an FM receiver that includes a multipath equalizer and an FM receiver that does not include a multipath equalizer.

DETAILED DESCRIPTION OF THE INVENTION (First Embodiment)

With reference to FIG. 1, an FM receiver according to a first embodiment receives an FM broadcast wave from antennas $100a$ and $100b$. Signals from the antennas $100a$ and $100b$ are input to tuner units $101a$ and $101b$. Then, a broadcast wave of a desired channel, that is, a signal of desired transmission frequencies, is selected, and receiving signals are generated. The receiving signals are input to a multipath equalizer (hereinafter referred to simply as an equalizer).

The equalizer includes multipliers $102a$ and $102b$ and an adder 103. The multipliers $102a$ and $102b$ multiply the receiving signals from the tuner units $101a$ and $101b$ by weights. The adder 103 adds results of the multiplications of the multipliers $102a$ and $102b$. An equalized output signal obtained by the adder 103 is demodulated by an FM demodulation unit 104.

The receiving signals from the tuner units $101a$ and $101b$ are also input to a receiving level measurement unit 105 and a weight calculation unit 107. The receiving level measurement unit 105 measures a level of the receiving signals, that is, a receiving level (more specifically, a received power). The weight calculation unit 107 calculates weights to be provided to the multipliers $102a$ and $102b$. The calculated weights are set to the multipliers $102a$ and $102b$ by a weight setting unit 108.

The receiving level measurement value output from the receiving level measurement unit 105 is input to a capture detection unit 106. The capture detection unit 106 detects a capture state based on weights calculated at the weight calculation unit 107 and the receiving level measurement value from the receiving level measurement unit 105. Here, the capture state means a state where a broadcasting station other than a desired broadcasting station, that is, an undesired broadcasting station, is acquired due to operation of the equalizer. A capture detection signal from the capture detection unit 106 is provided to the weight setting unit 108.

Here, the desired broadcasting station (the desired station) is a broadcasting station that allows the FM receiver to have a highest receiving level among a plurality of broadcasting stations that carry out broadcasting at the same frequency. The undesired broadcasting station (the undesired station) is a broadcasting station other than the desired station. For example, when there are A station and B station that currently allow the FM receiver to receive a broadcast signal, and if a receiving level of a signal from B station is higher than a receiving level of a signal from A station, A station is the undesired station and B station is the desired station.

FIG. 2 is a view showing a detail of the capture detection unit 106. The capture detection unit 106 includes a receiving level determination unit 201, a weight norm observation unit 202, an initialization unit 203, and a weight update unit 204. The receiving level determination unit 201 carries out threshold value determination with respect to a receiving level measurement value output from the receiving level measurement unit 105. The weight norm observation unit 202 observes a weight norm representing size of a weight calculated by the weight calculation unit 107, and carries out threshold value determination of the weight norm.

Figure 14:
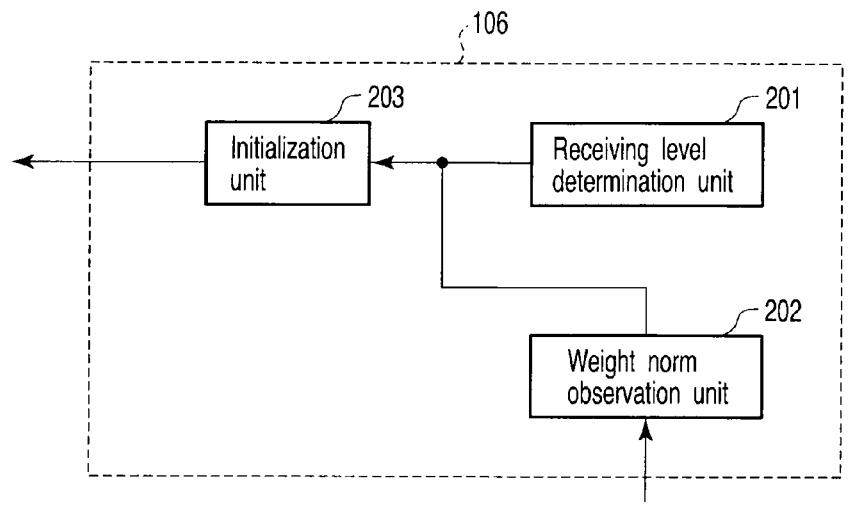
FIG. 14 is a block diagram showing a specific example of another capture detection unit.

A result of the determination of a receiving level by the receiving level determination unit 201 and a result of the determination of a weight norm are provided to the initialization unit 203 and the weight update unit 204. When the initialization unit 203 detects a capture in accordance with the two results of the determination, the initialization unit 203 outputs a capture detection signal. The weight setting unit 108 sets the weight calculated by the weight calculation unit 107 to the equalizer in a steady state. However, when the capture detection signal is given, the weight setting unit 108 sets a weight for initializing the equalizer to the equalizer. The weight update unit 204 instructs the weight setting unit 108 to update a weight that is set to the equalizer, in accordance with the two results of the determination described above. Specific processing steps of the capture detection unit 106 in FIG. 2 will be described more in detail later. Another realization of the capture detection unit 106 is shown in FIG. 14, where the outputs of receiving level determination unit 201 and weight norm observation unit 202 are input to the initialization unit 203. Initialization unit 203 outputs OFF signal, and weight calculation section uses the weights from the weight calculation unit 107 as long as initialization unit 203 does not detect the capture. In contrast, if the initialization unit detects the capture state by using the output of the receiving level determination unit 201 and weight norm observation unit 202, then the initialization unit 203 sends the initialization signal to the weight setting unit 108.

Here, description will be made by exemplifying a constant modulus algorithm (CMA) utilizing a fixed envelope characteristic of an FM modulation wave as one of algorithms for calculating a weight (coefficient) of the equalizer by the weight calculation unit 107. The FM modulation wave is originally of a fixed envelope. However, by passing through a multipath, the FM modulation wave loses a fixed envelop characteristic. The CMA is an algorithm that carries out multipath equalization by making close to a fixed envelope a receiving signal which has lost a fixed envelope characteristic by passing through a multipath.

First, brief description will be made with respect to the CMA. Now, when the receiving signals obtained from the antennas 100a and 100b through the tuner units 101a and 101b are x=(x1, x2), weights used for multiplying the receiving signal x in the multipliers 102a and 102b are w=(w1, w2), and an equalization output signal output from the adder 103 is y, a weight updating formula of the CMA algorithm using the steepest descent method in the weight calculation unit 107 can be expressed in the following formula:

$$w(n+1)=w(n)-\mu x(n)y^*(y^2-\sigma^2). \quad (1)$$

Here, $\mu$ represents a step coefficient, and $\sigma$ represents a target amplitude of the equalization output signal y.

As can be understood from the formula (1), according to the CMA algorithm, the target amplitude $\sigma$ is optional. Therefore, in case the receiving level (a level of the receiving signal x) is smaller than $\sigma$, the weight is controlled so as to reduce a multipath while increasing an entire level. That is, the CMA algorithm includes a function to reduce a multipath and an automatic gain control (AGC) function that makes the equalization output signal to the target amplitude. Details of the CMA algorithm is described, for example, in "Adaptive Antenna Technology" written by Nobuyoshi Kikuma.

A so-called CMA equalizer using the above CMA algorithm can send an equalization output signal with a reduced multipath to the FM demodulation unit 104, and in this manner, excellent sound can be provided to the user.

However, as described above, there is a problem that the CMA equalizer strengthens the capture phenomenon. Hereinafter, this point will be described in detail. As shown in FIG. 3A, for example, consideration will be made with respect to a case where there are two stations, A station and B station, that exist adjacent to each other, and the FM receiver as a receiving station moves from a location a in the vicinity of A station to a location b in the vicinity of B station. In this case, as shown in FIG. 3D, at the location a, a receiving level of a signal from A station is high and a receiving level of a signal from B station is low. When the FM receiver is moved near to the location b, this relationship is reversed in due time.

The FM receiver not including an equalizer receives and reproduces a signal from A station while a receiving level of a signal from A station is high as shown in FIG. 3C, and receives and reproduces a signal from B station when a receiving level of a signal from B station is high. That is, the FM receiver receives and reproduces a signal from a broadcasting station (the desired station) with a high receiving level at all times.

In contrast, in the FM receiver equipped with an equalizer, a phenomenon, in which a signal from A station is received and reproduced even when a receiving level of a signal from B station is high as shown in FIG. 3B, occurs. This phenomenon occurs due to a reason that once the FM receiver acquires A station when the FM receiver is located in the vicinity of A station, an effect of such acquisition continues even when a receiving level of a signal from B station becomes high. This is because weights of the equalizer were adjusted to eliminate the signal from B station when the FM receiver located near A station and this weighs value keep when the FM receiver comes near B station and works eliminating the signal from B station. Such a state is called 'capture state' in this application. That is, in this case, since a receiving level from B station is high, B station is the desired station. However, A station which is the undesired station with a receiving level lower than that of B station is actually acquired, and the FM receiver falls into the capture state.

Figure 4:
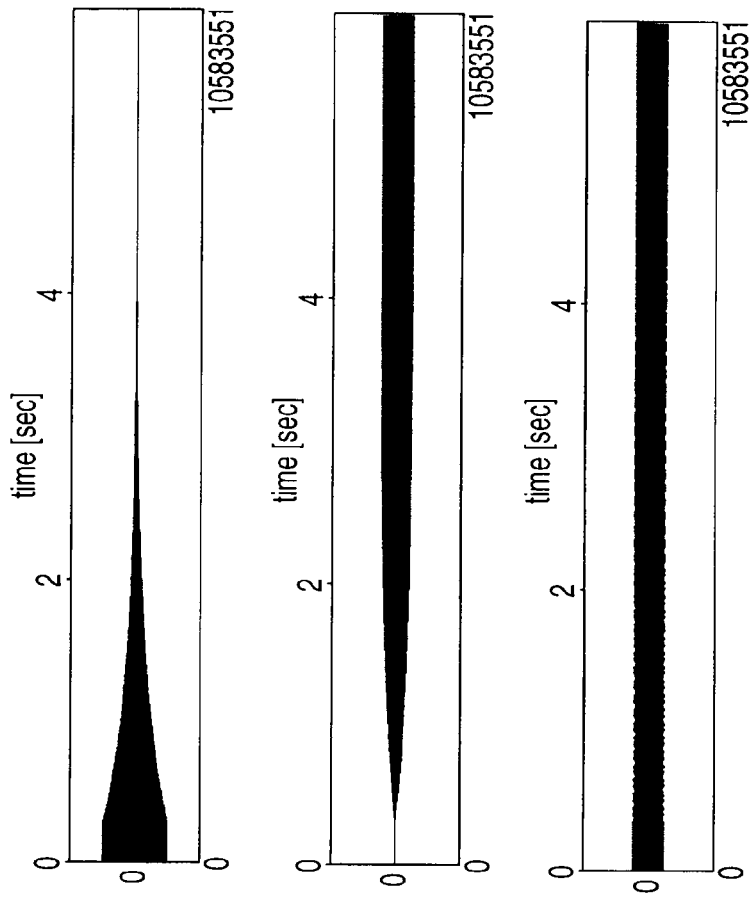
FIGS. 4A to 4C are views showing changes of receiving levels of signals from two broadcasting stations and a receiving level of a composite receiving signal.

FIGS. 4A to 4C schematically show each of receiving signals from A station and B station when the receiving station moves from the location a to the location b in FIGS. 3A to 3D. FIG. 4A shows a receiving signal from A station. FIG. 4B shows a receiving signal from B station. Further, FIG. 4C shows a composite signal of the receiving signals of FIGS. 4A and 4B. A signal actually received by the antenna is the composite signal in FIG. 4C, and the receiving level is the same at all times.

FIGS. 5A and 5B show sound outputs in case equalization is carried out with respect to a receiving signal by using a conventional equalizer. FIG. 5A shows an output (Lch) from a left speaker. FIG. 5B shows an output (Rch) from a right speaker. For convenience of understanding, A station sends a sound of 1 kHz only to the Lch, and B station sends a sound of 10 Hz only to the Lch.

First, when the receiving station is located in the vicinity of A station, a sound of 1 kHz is output only from the Lch, and there is almost no output from the Rch. Therefore, a waveform that is close to a transmission signal of A station is reproduced. FIG. 5A shows an enlarged view of the Lch.

On the right side with respect to the center of the graph, a signal of 1 kHz of A station is reproduced, although a receiving signal of B station is strong. In addition, in the same time frame, a waveform is observed in the Rch to which a signal has not originally been transmitted. This is because the equalizer amplifies a signal from A station with a small receiving level and outputs the signal to the FM demodulation unit. In this manner, noise is amplified and reproduced. When the graph is read on the further right side, the sound of 10 Hz is started to be reproduced from the Lch. Also, the noise component in the Rch is reduced.

FIGS. 6A to 6C show sound outputs reproduced by the receiver of the present embodiment. FIG. 6A is the Lch. FIG. 6B is the Rch. In addition, FIG. 6C shows a weight norm. Here, the weight norm has a value calculated by the following formula, and represents size of a weight:

$$W_{norm}=w_1^2+w_2^2 \quad (2)$$

In the present embodiment, the weight norm observation unit 202 in FIG. 2 observes the weight norm of the formula (2). In this manner, generation of the capture state described above is detected. As shown in FIG. 1, when there are a plurality of the antennas 100a and 100b, a result obtained by adding weights for the number of the antennas may be used.

Figure 15:
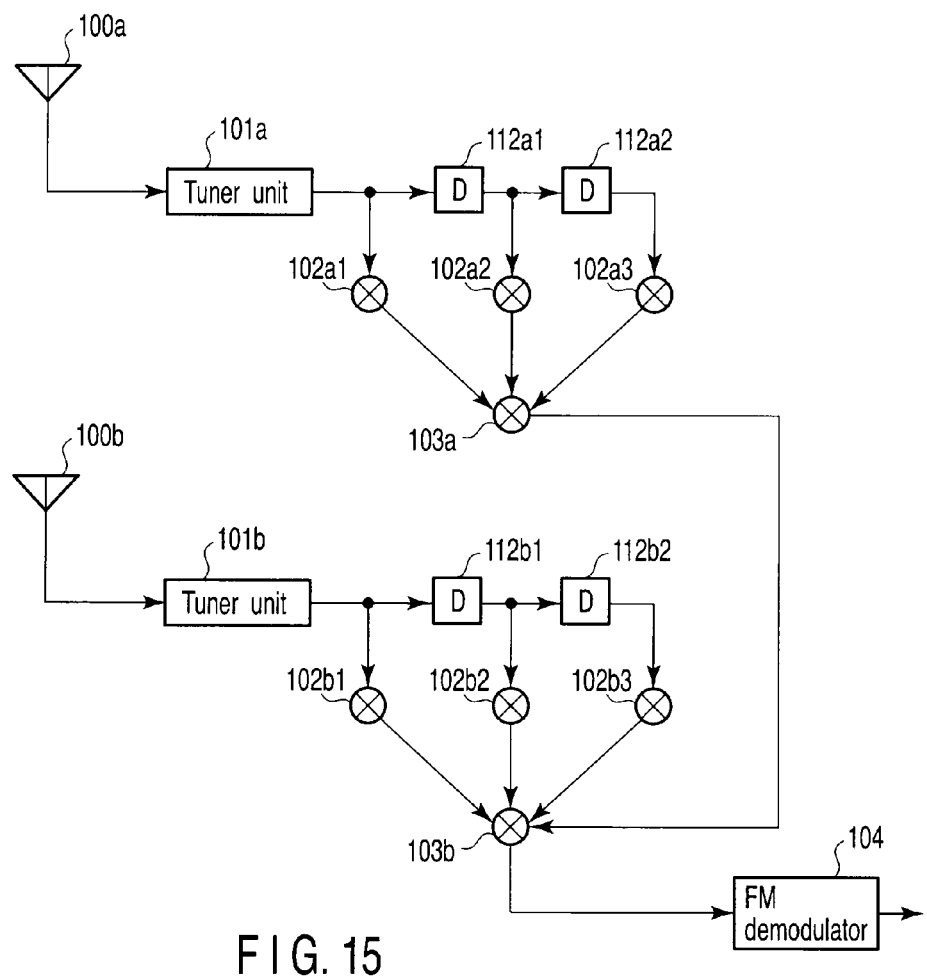
FIG. 15 is a block diagram showing another FM receiver according to a first embodiment.

Also, when there are a plurality of weights in a time domain as shown in FIG. 15, the apparatus is called 'space-time equalizer' and the all techniques in this application can be applicable to the space-time equalizer. FIG. 15 only describes the antenna, tuner unit and the space-time equalizer for the sake of simplicity. The space-time equalizer contains the weight multipliers 102a1, 102a2 and 102a3, delay units 112a1 and 112 a2, and adder 103a for the antenna 100a. On the other hand, is has weight multipliers 102b1, 102b2 and 102b3, delay units 112b1 and 112b2 and adder 103b for the antenna 100b.

When the space-time equalizer is used to equalize the FM signal, the norm of all the weights may be added. Alternatively, only a weight norm of some taps may be used. In a typical propagation environment, a path coming to the receiver first has the largest power and a path coming later has relatively lower power. In such case, a weight locating the least delay dominates the weights in the space-time equalizer. One of the most effective and cost effective way is to only use the norm of the weight locating the least delay, in other words, the first weight 102a1 and 102b1.

As shown in FIG. 6C, when a level of a signal from A station is lowered, and a signal from A station is output to the FM demodulation unit 104 regardless of a high level of a signal from B station, a value of a weight norm is gradually increased. This happens when a level of a signal from A station in the receiving signal is small, and the AGC function described above works to increase an entire level to correspond to the output level σ of the CMA. In this manner, a value of the weight norm is gradually increased.

In view of the above, in the present embodiment, when the weight norm observation unit 202 determines that the weight norm exceeds a threshold value that is determined in advance, the capture state is determined to occur. Then, the initialization unit 203 initializes the equalizer. A variety of methods have been known for initialization of the equalizer. One well-known method of initialization is to return to a so-called through state (a characteristic of an all path filter), in which size of only a certain weight is set to "1" and size of other weights is set to "0". However, the other value can be used such as "0.5" for all weights. On of the example when a space-time equalizer is used, weights regarding the least delay are set to "0.5" and the weights regarding the other delay are set to "0".

In FIGS. 6A to 6C, initialization is carried out by resetting when strong capture is generated after about 1.7 seconds.

More specifically, in the capture detection unit 106 in the present embodiment, when the weight norm observation unit 202 detects the capture state, the initialization unit 203 outputs a capture detection signal to the weight setting unit 108. When the weight setting unit 108 receives the capture detection signal, a weight for setting the equalizer to an initial state, that is, a through state, is set to the weight setting unit 108.

The equalizer is set to the initial state once, and then the weight is updated in the above manner. In this state, since the CMA has a characteristic to acquire a signal with a strong receiving level, the equalizer starts to output the equalized output signal obtained by equalizing a signal from B station to the FM demodulation unit 104. In this manner, as shown in FIGS. 6A and 6B, a signal from B station can be reproduced. In addition, a noise component in the Rch where a sound is not broadcast is extremely small.

Next, description will be made with respect to processing steps relating to weight control of the equalizer in the present embodiment with reference to FIG. 7.

First, when power of an entire system of the FM receiver is turned on, the equalizer is initialized (Step S11). A representative initialization method is a method that sets only a weight w1 to "1" and sets the remaining weights to "0" as described above. Still, as described above, there are several other methods such as "0.5" for all. The initialization is carried out by the initialization unit 203 through the weight setting unit 108.

Next, when the initialization is finished, the weight update unit 204 issues an instruction to update weights to the weight setting unit 108. The weight setting unit 108 uses the weights calculated by the weight calculation unit 107 to update the weights set to the equalizer based on the formula (1) (Step S12).

Next, a value of the weight norm is observed based on the formula (2) (Step S13). Calculation of the weight norm may be carried out by observing a part of a number of weights, not only by the formula (2).

When the value of the weight norm is determined to exceed a threshold value Wth set in advance in Step S13, the receiving level measured by the receiving level measurement unit 105 is determined by the receiving level determination unit 201 next (Step S14). Here, when the receiving level is larger than a threshold value Vth set in advance in Step S14, the capture state is determined to be detected. In this case, the processing returns to Step S11, and the equalizer is initialized.

A reason for determining the receiving level by using the threshold value Vth is as described below. For example, consideration will be made with respect to a case where there is no signal from B station such as one shown in FIG. 4B. As time passes, a signal from A station becomes lower, and there is no signal from B station. Accordingly, the receiving level is gradually lowered. At this time, the equalizer sets a signal from A station to a certain value (that is, the target amplitude σ) and continues to send the signal to the FM demodulation unit 104. Therefore, a value of the weight norm becomes large.

In this case, there exists no signal from B station that replaces the signal from A station. Therefore, the signal from A station is desirably received and reproduced. Accordingly, when a receiving level is lowered in a situation where there is no station that replaces A station, the signal from A station desirably continues to be received and reproduced even with the large weight norm. According to the present embodiment, in the above case, the receiving level is determined not to satisfy the threshold value Vth in Step S14. Therefore, the initialization of the equalizer is not carried out.

As an alternate embodiment, the threshold value Wth of the weight norm may be set based on the receiving level, and the determination processing of the receiving level in Step S14 may be omitted. That is, when the receiving level is high, the threshold value Wth is set to a small value. When the receiving level is low, the threshold value Wth is set to a large value. In other words, the higher the receiving level, the smaller value the threshold value Wth is set to. In case B station as a replacing station is located in the vicinity of A station, the receiving level is high. Accordingly, the threshold value Wth of the weight norm becomes low in this manner, easily shifting to receiving and reproducing of a signal from B station. In contrast, when B station is located farther than A station, a signal from A station is received and reproduced as much as possible. In this manner, shifting to receiving and reproducing of a signal from B station can be prevented. When the FM receiver has Automatic Gain Control (AGC) system, the signal at the input to the equalizer is adjust to the predefined level. In this case, the S14 can be omitted because the receiving level at the input to the equalizer is the same all the time.

As described above, according to the present embodiment, a signal from the desired station with a strong receiving level can be received and reproduced at all times. In this manner, a high quality sound can be provided to the user.

(Second Embodiment)

Next, description will be made with respect to a second embodiment. As shown in FIG. 8, the FM receiver according to the second embodiment includes a plurality of FM demodulation units 104a and 104b, and a plurality of decoders 109a and 109b. The decoders 109a and 109b receive output signals from the FM demodulation units 104a and 104b. The FM demodulation unit 104a demodulates an equalized output signal as similar to the FM demodulation unit 104 in FIG. 1. A receiving signal not passing the equalizer, such as a receiving signal from the tuner unit 101a, is directly input to the FM demodulation unit 104b. The FM demodulation unit 104b demodulates the receiving signal.

The radio data system (RDS)/radio broadcast data system (RBDS) decoders 109a and 109b decode a specific unit of output signals (composite signal) of the FM demodulation units 104a and 104b. In this manner, station identification information called a broadcasting station identification number is extracted. The extracted broadcasting station identification number is given to the capture detection unit 106.

Here, an output signal from the FM demodulation unit 104a that demodulates the equalized output signal is input to the RDS/RBDS decoder 109a. An output signal from the FM demodulation unit 104b that directly demodulates a receiving signal from the tuner unit 101a is input to the RDS/RBDS decoder 109b. That is, the RDS/RBDS decoder 109a extracts the broadcasting station identification number in the equalized output signal. The RDS/RBDS decoder 109b extracts the broadcasting station identification number in the receiving signal that does not pass through the equalizer.

RDS/RBDS is digital modulation data that transmits the broadcasting station identification number and the like. The data is called RDS in Europe, and RBDS in the United States. The RDS/RBDS is multiplied on high frequencies of a signal called a composite signal after FM demodulation. FIG. 9 shows an image diagram of an FM composite signal. The FM composite signal is a signal obtained by FM demodulating a receiving signal. As shown in FIG. 9, the sum (Lch+Rch) of the left signal Lch and a right signal of a speaker is multiplied on lowest frequencies. A difference (Lch−Rch) of the left signal (Lch) and the right signal of the speaker is multiplied on frequencies around 38 kHz. Further, the RDS/RBDS signal is multiplied on frequencies around 57 kHz. RDS/RBDS decoding is carried out by using the FM composite signal.

As described above, the terms RDS and RBDS are used in Europe and the United States, respectively. In Japan, the broadcasting station identification number is included in FM teletext broadcasting that is multiplied on the FM composite signal in a similar manner. Therefore, as to a receiver used in Japan, the RDS/RBDS decoder is replaced by an FM teletext broadcasting decoder. Still, there is no difference between these decoders with respect to a point that the broadcasting station identification number detected by a decoder is output to the capture detection unit 106. With respect to the RDS/RBDS and the FM teletext broadcasting, a decoding method is described in a large number of documents. Accordingly, description of the decoding method will be omitted.

Figure 10:
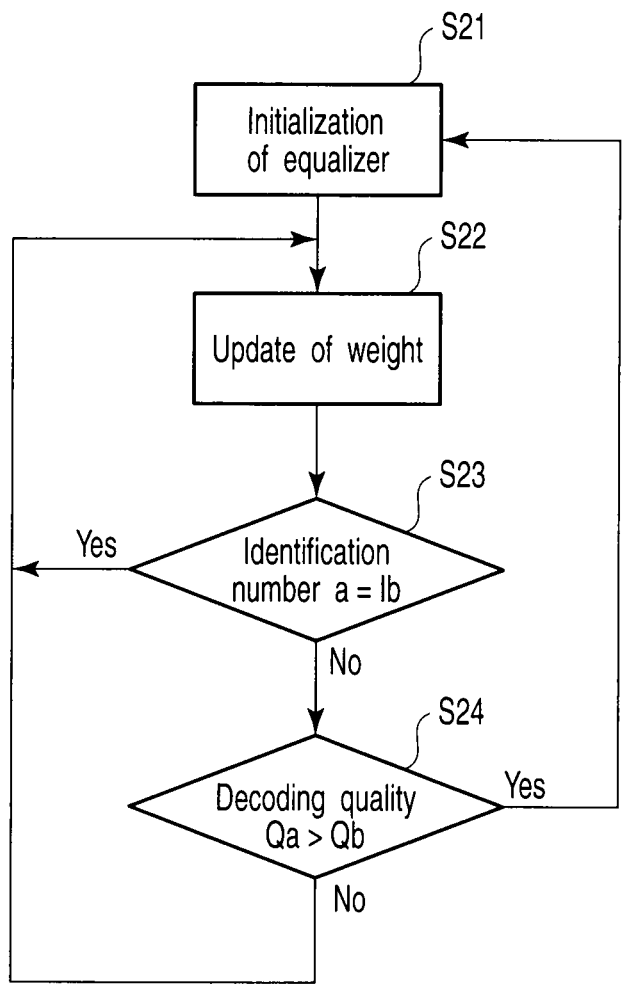
FIG. 10 is a flowchart showing a flow of the equalizing processing by the multipath equalizer in the second embodiment.

Next, description will be made with respect to processing steps relating to weight control of the equalizer in the second embodiment with reference to FIG. 10.

Steps S21 and S22 regarding the initialization and the weight update of the equalizer are same as Steps S11 and S12 in the first embodiment.

In Step S23 which is a next step of Step S22, a broadcasting station identification number Ia detected by the RDS/RBDS decoder 109a that decodes the composite signal from the FM demodulation unit 104a that demodulates the equalizer output signal and a broadcasting station identification number Ib detected by the RDS/RBDS decoder 109b that decodes the composite signal from the FM demodulation unit 104b that demodulates a signal that does not pass through the equalizer are compared.

Here, reference is made to FIGS. 3A to 3D. In case the FM receiver that is a receiving station exists in the location a in the vicinity of A station, the RDS/RBDS decoder 109a extracts an identification number of A station. Also, the RDS/RBDS decoder 109b outputs the identification number of A station as well. In this case, Ia=Ib is determined in Step S23. Then, the weight update is carried out in a normal manner.

In contrast, consideration will be made with respect to a case where the FM receiver moves in a direction to the location b, and a receiving level from B station becomes somewhat larger than that from A station. In this case, the RDS/RBDS decoder 109a should output the identification number of A station, and the RDS/RBDS decoder 109b should output the identification number of B station. That is, the RDS/RBDS decoder 109a that extracts the broadcasting station identification number in the equalized output signal outputs an identification number of a broadcasting station (A station in this case) acquired by operation of the equalizer. In contrast, the RDS/RBDS decoder 109b that extracts the broadcasting station identification number in the receiving signal that does not pass through the equalizer purely outputs the identification number of a broadcasting station (B station in this case) with a stronger receiving level. Accordingly, in this case, Ia≠Ib is determined in Step S23.

When Ia≠Ib is determined in Step S23, decoding qualities Qa and Qb of the RDS/RBDS decoders 109a and 109b are compared. As decoding quality of the RDS/RBDS decoder, for example, the number of cyclic redundancy check (CRC) errors, the number of synchronization errors, or the number of locks of phase-locked loop (PLL) can be used.

Here, in case the decoding quality Qb of the RDS/RBDS decoder 109b is higher than the decoding quality Qa of the RDS/RBDS decoder 109a (in case a result of Step S24 is NO), a broadcasting station shown by the broadcasting station identification number extracted by the RDS/RBDS decoder 109b is determined to exist near the receiving station. Then, the processing moves to Step S21 to carry out the initialization of the equalizer. In contrast, in case the Qb is lower than the Qa (in case a result of Step S24 is YES), the broadcasting station identification number extracted by the RDS/RBDS decoder 109b is determined not reliable. Accordingly, the equalizer updates weights in a normal manner.

Here, in case different stations are identified in the RDS/RBDS decoders 109a and 109b (in case a result of Step S23 is NO), the comparison between the decoding qualities Qa and Qb is carried out in the next Step S24. However, the processing of Step S23 may be omitted in order to reduce a load of implementation. That is, when Ia≠Ib in Step S23, the processing may return to Step S21 and the initialization of the equalization may be carried out.

As described above, in the present embodiment, the station identification number Ia detected by the RDS/RBDS decoder 109a by passing through the equalizer and the station identification number Ib detected by the RDS/RBDS decoder 109b without passing through the equalizer are compared. In this manner, whether the capture state described above occurs in the equalizer or not is determined. When the capture state is determined to have occurred, the initialization of the equalizer is carried out, and the equalizer is temporarily set to be in a through state. The CMA that updates weights of the equalizer has a characteristic to acquire a signal with strong electric power when initialization is carried out. Therefore, according to the present embodiment, a sound from a station with a high receiving level and a high signal-to-noise ratio (SNR) can be provided to the user at all times.

In the present embodiment, a receiving signal from the tuner unit 101b connected to the antenna 100b is input to the RDS/RBDS decoder 109b. Alternatively, receiving levels of the antennas 100a and 100b may be compared, and one with a higher receiving level of the receiving signals from the tuner units 101a and 101b connected to the antennas 100a and 100b may be input to the RDS/RBDS decoder 109b. In this manner, more reliable station selection can be carried out.

(Third Embodiment)

As shown in FIG. 11, the FM receiver according to a third embodiment includes a high-frequency extraction unit 110. The high-frequency extraction unit 110 extracts a high frequency component of the composite signal shown in FIG. 9 which is an output of the FM demodulation unit 104. More specifically, the high-frequency extraction unit 110 extracts, for example, a high frequency component of 100 kHz to 200 kHz from the composite signal output from the FM demodulation unit 104. Then, the high-frequency extraction unit 110 outputs a level measurement value according to a level (electric power) of the high frequency component. The capture detection unit 106 uses the receiving level measured by the receiving level measurement unit 105 and the level measurement value of the high frequency component of the composite signal extracted by the high-frequency extraction unit 110 to detect the capture state with respect to the undesired station.

As shown in FIG. 9, a signal is not multiplied on frequencies higher than around 57 kHz, for example, around 100 kHz, of the composite signal. However, when a level of the signal is lowered, a noise component is generated in high frequencies of the composite signal. Alternatively, when there are components of the same channel, noise due to interference is generated at high frequencies of the composite signal. The present embodiment detects a high frequency component of noise generated by influence of the component of the same channel to detect the capture. As an extracting method of the high frequency component, for example, a bypass filter can be used.

Next, description will be made with respect to processing steps relating to weight control of the equalizer in the present embodiment with reference to FIG. 12.

Steps S31 and S32 regarding the initialization and the weight update of the equalizer are same as Steps S11 and S12 in the first embodiment.

In Step S33 which is a next step of Step S32, the capture detection unit 106 compares the high frequency level measurement value of the composite signal output from the high-frequency extraction unit 110 with a threshold value Nth. When the level measurement value of the high frequency component exceeds the threshold value Nth, possibility that the capture has been generated is determined to be high, and the processing advances to Step S33.

In Step S34, the capture detection unit 106 compares the receiving level measured by the receiving level measurement unit 105 with the threshold value Vth. Here, when the receiving level is larger than the threshold value Vth set in advance in Step S33, the capture state is determined to be detected. In this case, the processing returns to Step S31, and the equalizer is initialized.

As described above, as a reason for the increase in the high frequency component (noise component) of the composite signal, there is a case where the receiving level is simply lowered to become noise in addition to the problem of the same channel. Therefore, measurement of a receiving level is carried out separately by using a receiving signal before equalization. In Step S34, when the receiving level exceeds the threshold value Vth, the noise component of high frequencies is determined to be caused by the equalizer falling into the capture state, and the capture is determined to be detected. In case the capture state is detected, the equalizer is initialized. In this manner, the equalizer can acquire a signal from a broadcasting station with a high receiving level.

The description was made with respect to the first to third embodiments by assuming a case that a plurality of broadcasting stations broadcast the same content at the same frequencies. However, the present invention is also effective with respect to a case where a plurality of broadcasting stations transmit different contents at the same frequencies in adjacent areas (prefectures and countries).

As can be understood from FIG. 3, when the conventional equalizer is used, acquisition of B station is finally started after a receiving level from A station becomes very small along movement of the receiving station and a receiving level from B station becomes considerably large. In contrast, when the receiving station moves from the vicinity of B station in a direction to A station, acquisition of A station is finally started when the receiving level from B station becomes very small and the receiving level from A station becomes considerably large. As described above, the receiver using the conventional equalizer shows very large hysteresis in acquisition of a broadcasting station.

For example, when the user who receives a signal of a certain broadcast from A station around a border of prefectures or countries moves very close to B station in an adjacent prefecture or country, the user receives a different signal of broadcast from B station. In such a case, according to a general FM receiver not using the equalizer, when the user returns to a position where a receiving level of a signal from A station is large, he or she can immediately receive the signal from A station.

However, the FM receiver including the conventional equalizer shows the hysteresis described above. Accordingly, there is a problem that, when the user acquires B station in an adjacent prefecture or country once, he or she cannot acquire A station unless the receiver is moved away from B station and very close to A station. From the viewpoint of the user of the FM receiver, the above problem is not preferable. This is because the user receives the undesired signal from B station although the user desires to continue receiving and reproducing of the signal from A station.

According to the present embodiment, while the FM receiver includes the equalizer, the capture effect is determined by a magnitude of a receiving level as similar to the FM receiver not using the equalizer. That is, according to the present embodiment, a station with a high SNR when viewed from the receiver can be acquired and received at all times. Therefore, even when B station is acquired once in a situation as described above, A station can be acquired immediately when the receiver is moved near A station.

(Fourth Embodiment)

Next, description will be made with respect to a fourth embodiment with reference to FIG. 13. The receiver shown in FIG. 13 is the receiver shown in FIG. 1 added with an adjacent channel detection unit 111. The adjacent channel detection unit 111 detects a signal of frequencies that is adjacent to transmission frequencies of the desired station selected by the tuner units 101a and 101b, that is, a signal of an adjacent channel of a channel that is used by the desired station.

When the adjacent channel detection unit 111 detects a signal of an adjacent channel in the above manner, the initialization of the equalizer by the weight setting unit 108 is not carried out even if the capture state is detected in the capture detection unit 106. When a signal of an adjacent channel is mixed in a receiving signal, such a signal may be detected as the capture state in error in the capture detection unit 106. According to the present embodiment, the initialization of the equalizer is not carried out in the above-described case. In this manner, a signal from the desired station can be listened to at all times. An initialization stopping control of the equalizer carried out by the adjacent channel detection unit 111 is effective with respect to the third embodiment.

(Fifth Embodiment)

Next, description will be made with respect to a fourth embodiment with reference to FIG. 16. The receiver shown in FIG. 16 is the receiver shown in FIG. 1 added with an multipath detection unit 111. The multipath detector 111 detects the multipath. As explained in the first embodiment, the FM signals lose the constant envelope characteristics if they experience the multipath. When there is a large delay path in the environment, the received power of the signal sometimes becomes large and sometimes small. Accordingly, the weights sometimes become large and sometimes small. Therefore, in such a severe multipath environment, the weights often exceed the threshold and the receiver detects the capture state while there is no other broadcasting station other than the broadcast station of interest. This misjudge can be improved by using the result of multipath detector 111.

The procedure of this embodiment is as follows.

Firstly, the multipath detector extracts some frequency component from the receiving signal. For example, adding the cosine of sign wave having 19 kHz is multiplied to the receiving signal and extracts the frequency component at the 19 kHz. When the FM receiver is in a severe multipath environment, the power of the output is sometimes very high and sometimes very low. One of the ways to detect the multipath is to define the threshold and count how much time the power cross the threshold. If the number of the level-cross exceeds another threshold, the multipath detector sends the weight calculation unit 107 that there is 'severe multipath'.

Although the capture detection unit 106 detects the capture state, the weight calculation unit 108 does not initialize the weight if the multipath detector 111 sending the 'severe multipath' signal.

By applying the multipath detector 111, the FM receiver avoids the misjudgment and provides high quality sounds to the end user.

In the description, CMA is used for updating the weights of the equalizer, however, the other algorithms such as MMSE can be used for the embodiments. The detail of MMSE algorithm is shown in "Adaptive filter theory" by Simon Haykin.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A receiver, comprising:
    a plurality of tuners, each tuner configured to receive a signal from a broadcasting station and output a receiving signal;
    a plurality of weight calculators that each output a calculated weight;
    an equalizer that equalizes the receiving signals by using equalizer weights, and obtains an equalized output signal;
    a demodulator that demodulates the equalized output signal;
    a detection unit that performs a comparison of a value obtained from the calculated weights and a threshold value, and generates a capture detection signal when at least the value obtained from the calculated weights exceeds the threshold value; and
    a weight setting unit that sets the calculated weights with respect to the equalizer as the equalizer weights after the weight calculators output the calculated weights, and sets specific weights for initializing the equalizer as the equalizer weights when the capture detection signal is generated.

2. The receiver according to claim 1, further comprising a signal detection unit that detects a signal of which frequencies adjacent to transmission frequencies of a desired broadcasting station included in the receiving signal, wherein
    the weight setting unit stops setting of the specific weights when the signal having the adjacent frequencies is detected.

3. The receiver according to claim 1, wherein the receiver is an FM receiver.

4. The receiver according to claim 1, wherein the specific weights for initializing the equalizer is the same as weights used when the receiver is initially powered on.

5. The receiver according to claim 1, wherein the value obtained from one or more of the calculated weights is a power of the calculated weights.

6. The receiver according to claim 1, wherein the value obtained from one or more of the calculated weights is a weight norm.

7. The receiver according to claim 1, wherein the specific weights includes only a certain weight which is set to "1" and other weights which are set to "0".

8. The receiver according to claim 1, wherein the specific weights are weights for setting the equalizer in a through state.

9. The receiver according to claim 1, wherein the specific weights are weights for setting the equalizer in a characteristic of an all path filter.

10. The receiver according to claim 1, wherein the value obtained from one or more of the calculated weights is calculated by adding the calculated weights.

11. The receiver according to claim 1, wherein the value obtained from one or more of the calculated weights is calculated by adding some of the calculated weights.

12. The receiver according to claim 1, wherein the value obtained from one or more of the calculated weights is calculated by sum of squares of the calculated weights.

13. The receiver according to claim 1, wherein the threshold value is determined based on a receiving level of the receiving signal.

14. The receiver according to claim 1, wherein the specific weights for initializing the equalizer are set to the equalizer as the weights when a power of the receiver is turned on.

15. The receiver according to claim 1, wherein the weight calculators calculate calculated weights after the specific weights are set to the equalizer as the weights.

16. The receiver according to claim 1, wherein:
    the plurality of tuners are for receiving an FM signal,
    at least one of the tuners receives a signal from a first FM broadcasting station that broadcasts over a specified frequency, each weight calculator outputs a calculated weight for optimizing a reception quality of the receiving signal of the first FM broadcasting station, and the detection unit generates the capture detection signal based on the receiver being within a vicinity of a second FM broadcasting station that broadcasts over the same specified frequency as the first FM broadcasting station.

17. A receiver, comprising:

a plurality of tuners, each tuner configured to receive a signal from a broadcasting station and output a receiving signal;

a plurality of weight calculators that each output a calculated weight;

an equalizer that equalizes the receiving signals by using equalizer weights, and obtains an equalized output signal;

a demodulator that demodulates the equalized output signal;

a measurement unit that measures a level of the receiving signal; and a weight setting unit that sets the calculated weights with respect to the equalizer as the equalizer weights after the weight calculators output the calculated weights, and sets specific weights for initializing the equalizer as the equalizer weights when a value obtained from one or more of the calculated weights exceeds a first threshold value based on a comparison of the value and the first threshold value, and the level of the receiving signal exceeds a second threshold value based on a comparison of the level and the second threshold value.

18. A receiver, comprising:

a plurality of tuners, each tuner configured to receive a signal from a broadcasting station and output a receiving signal;

a plurality of weight calculators that each output a calculated weight;

an equalizer that equalizes the receiving signals by using equalizer weights, and obtains an equalized output signal;

a demodulator that demodulates the equalized output signal;

a first extraction unit that extracts first station identification information from the equalized output signal;

a second extraction unit that extracts second station identification information included in the receiving signal;

a detection unit that compares the first station identification information and the second station identification information and generates a capture detection signal when at least the first station identification information is different from the second station identification information; and a weight setting unit that sets the calculated weights with respect to the equalizer as the equalizer weights after the weight calculators output the calculated weights, and sets specific weights for initializing the equalizer as the equalizer weights when the capture detection signal is generated.

19. The receiver according to claim 18, wherein the first extraction unit decodes a specific section of the equalized output signal to extract the first station identification information, the second extraction unit decodes a specific section of the receiving signal to extract the second station identification information, and the detection unit compares a decoding quality of the first extraction unit and a decoding quality of the second extraction unit, and generates the capture detection signal when the first station identification information and the second station identification information are different, and the decoding quality of the first extraction unit is higher than the decoding quality of the second extraction unit.

20. A receiver, comprising:

a plurality of tuners, each tuner configured to receive a signal from a broadcasting station and output a receiving signal;

a plurality of weight calculators that each output a calculated weight;

an equalizer that equalizes the receiving signals by using equalizer weights, and obtains an equalized output signal;

a demodulator that demodulates the equalized output signal and outputs a demodulated signal;

an extraction unit that extracts a high-frequency component from the demodulated signal;

a detection unit that compares a level of the high frequency component and a threshold value and generates a capture detection signal when the level of the high-frequency component exceeds the threshold value; and a weight setting unit that sets the calculated weights with respect to the equalizer as the equalizer weights after the weight calculators output the calculated weights, and sets specific weights for initializing the equalizer as the equalizer weights when the capture detection signal is generated.

21. The receiver according to claim 20, further comprising a measurement unit that measures a level of the receiving signal, wherein the detection unit generates the capture detection signal when the level of the high-frequency component exceeds the first threshold value and the level of the receiving signal exceeds a second threshold value.

* * * * *